3,276,886
ASPHALT EMULSIONS
Armin C. Pitchford and James T. Gragson, Bartlesville, Okla., assignors to Phillips Petroleum Company, a corporation of Delaware
No Drawing. Filed June 6, 1963, Ser. No. 285,891
10 Claims. (Cl. 106—277)

This invention relates to asphalt emulsions. In another aspect it relates to alkaline oil-in-water cationic asphalt emulsions, slurries of such emulsions with siliceous aggregate, and methods of preparing and using such emulsions and slurries.

The use of asphalt emulsions in the construction and repair of roads, pavements, soil stabilization, and the like has become increasingly important since the end of World War II. A type of asphalt emulsion which recently has come into widespread use in large volumes for such purposes is the acidic, oil-in-water cationic asphalt emulsion. Acidic cationic asphalt emulsions are very effective on electronegative aggregates, particularly siliceous aggregates. The cationic asphalt emulsions can be used as seal coats, or mixed with fine siliceous aggregates (e.g., crusher dust and/or sand) to form a slurry seal coat, or mixed with coarse aggregates in the construction and surfacing of pavements.

A problem encountered in the application of such acidic cationic asphalt emulsions, however, is the tendency of such emulsions to promote corrosion of vessels in which they are stored and in equipment used to apply them. The use of acid, such as hydrochloric acid, in the preparation of acidic cationic asphalt emulsions requires safety measures in handling such acid and acid-treated materials; even with such safety measures, manufacturing personnel often find it disagreeable to work with acidic materials.

Accordingly, an object of this invention is to provide an improved asphalt emulsion. Another object is to provide rapid-setting alkaline cationic asphalt emulsion. Another object is to convert a rapid-setting alkaline cationic asphalt emulsion into a slow-setting alkaline cationic emulsion. Another object is to provide an improved slurry of an alkaline cationic asphalt emulsion and siliceous aggregate. Another object is to provide a method of preparing such emulsions. Another object is to provide a method of using such emulsions in paving and resurfacing roads and the like. Other objects and advantages of this invention will become apparent to those skilled in the art from the following disclosure and accompanying claims.

We have now discovered that improved alkaline oil-in-water cationic asphalt emulsions can be prepared by employing select cationic emulsifying agents of the general formula:

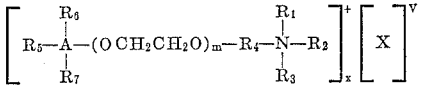

where $R_1$ and $R_2$ are lower alkyl hydrocarbon radicals having, for example, 1 to 3 carbon atoms, such as methyl, ethyl, propyl (preferably methyl), $R_3$ is also an alkyl radical (preferably methyl) or an aryl, alkaryl or aralkyl hydrocarbon radical having, for example, 6 to 7 carbon atoms, such as phenyl, benzyl or tolyl, $R_4$ is a lower alkylene hydrocarbon radical having, for example, 1 to 2 carbon atoms, such as methylene and ethylene, $R_5$ is a long chain alkyl hydrocarbon radical having, for example, 8 to 25, preferably 8 to 20, carbon atoms, such as octyl, dodecyl, pentadecyl, eicosyl and pentacosyl, $R_6$ and $R_7$ are hydrogen atoms or lower alkyl radicals having, for example, 1 to 5 carbon atoms, A is a benzene nucleus, X is a hydroxyl or a salt-forming anion such as nitrate, sulfate, secondary phosphate, acetate, benzoate, salicylate and preferably a halogen, such as chlorine or bromine, $m$ is an integer equal to 0 or 1, $v$ is the valence of said hydroxyl or anion, and $x$ is an integer equal to said valence. These cationic emulsifying agents are quaternary ammonium compounds, and we prefer to use those which are chloride salts and where the sum of carbon atoms in $R_1$, $R_2$ and $R_3$ does not exceed 12 and the sum of carbon atoms in $R_6$ and $R_7$ does not exceed 6.

Representative cationic emulsifying agents coming within the scope of general Formula 1 above and useful in the practice of this invention include:

p-n-octylbenzyldimethylphenylammonium chloride,
p-diisobutylbenzyltrimethylammonium chloride,
4-n-nonl-3,5-dimethylbenzyldiethylbenzylammonium chloride,
2-n-dodecyl-3-methyl-5-isopentylphenylethylmethyl-n-butyltolylammonium chloride,
4-(5,6-dimethyl)pentadecyl-3,5-diethylphenylethylmethyl-ethylphenylammonium chloride,
3-methyl-4-n-eicosyl-5-ethylbenzyltriethylammonium chloride,
3,5-di-n-propyl-4-n-pentacosylphenylethyldi-n-pentyltolyl-ammonium chloride,
p-n-octylphenoxyethoxyethyltrimethylammonium chloride,
p-(3-methyldodecyl)benzyltrimethylammonium chloride,
p-diisobutylphenoxyethoxyethyldimethylbenzylammonium chloride,
3,5-dimethyl-4-n-octylphenoxyethoxyethyldiethylphenyl-ammonium chloride,
2-(3,4,5-triethyl)tetradecyl-3,4-diisopropylphenoxyethoxy-ethylmethyl-n-butyltolylammonium chloride,
p-diisobutylcresoxyethoxyethyltrimethylammonium chloride,
3-methyl-5-n-pentyl-4-n-eicosylphenoxyethoxyethyl-di-n-butylphenylammonium chloride,
2-methyl-6-n-amyl-4-n-pentacosylphenoxyethoxyethyl-di-n-amyl-tolylammonium chloride, and the like, including mixtures thereof, and the corresponding hydroxides, nitrates, sulfates, phosphates, acetates, benzoates, salicylates, and bromides.

There are a number of commercially available water soluble cationic emulsifying agents which can be used in this invention, including: Hyamine 1622, octylphenoxy-ethoxyethyldimethylbenzylammonium chloride; Hyamine 2389, methyldodecylbenzyltrimethylammonium chloride; and Hyamine 10–X, octylcresoxyethoxyethyldimethylben-zylammonium chloride.

In preparing the cationic asphalt emulsions of this invention, any basic agent can be used to render the oil-in-water emulsions alkaline, the amount of such basic agent used being sufficient (and usually less than 1 weight percent of the emulsion) to give the emulsion an alkaline pH value, for example, of 7.5 to 11, preferably 8 to 10.5. For this purpose, alkali or alkaline earth metal oxides and hydroxides are preferred, such as potassium hydroxide, sodium hydroxide, calcium hydroxide, calcium oxide, and barium oxide.

Asphalts which can be employed in the preparation of the novel alkaline cationic asphalt emulsions of this invention include any of those bituminous materials used heretofore and known in the prior art, such as natural asphalts or those derived from petroleum refining, for example by steam refining and/or air blowing, etc. Paving asphalts characterized by penetrations (ASTM D-5) from zero to about 300 or even higher, and preferably from about 40–300, and having softening points (ASTM D-36-26) in the range of 90° to 250° F., preferably 100° to 150° F., represent suitable asphalts which can be used.

Although not essential, other materials used in preparing cationic asphalt emulsions, including such stabilizing agents as hydroxyethyl cellulose, aluminum chloride, and calcium chloride, can be used in preparing the emulsions of this invention. Such modifiers, where used, will usually total up to about 0.5 weight percent of the emulsion.

Where the sole emulsifying agent used in this invention is one of said select cationic emulsion agents, shown in general Formula 1, the emulsion will be rapid-setting. Such emulsions are stable over a long period of time and break in a matter of seconds in the presence of siliceous aggregates. Where a medium- or slow-setting alkaline cationic asphalt emulsion is desired, it is within the scope of this invention to obtain the same by incorporating in the normally slow-setting cationic asphalt emulsion select nonionic emulsion agents of the general formula:

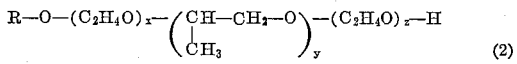
(2)

where:

R is selected from the group consisting of hydrogen, aryl, and alkaryl radicals; and $x$, $y$ and $z$ are integers, such that (1) when $x$ is zero, $y$ is also zero, $z$ is in the range of 6 to 11, inclusive, and said R is one of said aryl and alkylaryl radicals, and (2) when $x$ and $y$ are each greater to zero, the sum of $x$ and $z$ is in the range of 20 to 40, inclusive, and $y$ is in the range of 40 to 60, inclusive.

The nonionic emulsifying agents are used in this invention in combination with above-described class of cationic emulsifying agents of general Formula 1 to provide asphalt emulsions which are medium- or slow-setting in the presence of siliceous aggregates.

The nonionic emulsifying agents which are used in this invention, as shown by the above general Formula 2, represent a rather narrow class of compounds and they each have a critical balance of a hydrophobic component (propyleneoxy) and a hydrophilic component (ethyleneoxy) which is necessary to extend the mixing time of cationic asphalt emulsions. Within the general Formula 2 given above for these nonionic emulsifying agents, there are two preferred subclasses which can be represented by the following general formulas:

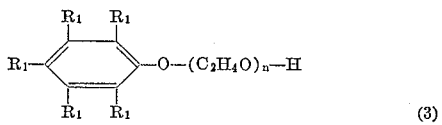
(3)

where $R_1$ is selected from the group consisting of hydrogen and alkyl hydrocarbon radicals (each such alkyl radicals preferably having 1 to 25 carbon atoms, and the total carbon atoms in the sum of such alkyl radicals preferably not exceeding 25), and $n$ is an integer in the range of 6 to 11, inclusive; and

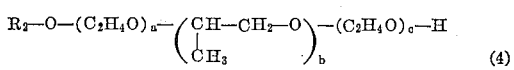
(4)

where $a$ and $c$ are integers greater than zero and whose sum is in the range of 20 to 40, inclusive, $b$ is an integer in the range of 40 to 60, inclusive, and $R_2$ is selected from the group consisting of hydrogen and the hydrocarbon radical

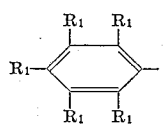

where $R_1$ is as defined above.

Representative examples of the nonionic emulsifying agents which can be used in this invention include:

phenoxypenta(ethyleneoxy)ethanol,
phenoxyocta(ethyleneoxy)ethanol,
phenoxyennea(ethyleneoxy)ethanol,
phenoxydeca(ethyleneoxy)ethanol,
4-methylphenoxypenta(ethyleneoxy)ethanol,
2,3,6-triethylphenoxyhepta(ethyleneoxy)ethanol,
4-(1,1,3,3-tetramethylbutyl)phenoxyhepta(ethyleneoxy)ethanol,
4-(1,3,5-trimethylhexyl)phenoxyhexa(ethyleneoxy)ethanol,
4-nonylphenoxyhepta(ethyleneoxy)ethanol,
2,3,4,5,6-penta-n-pentylphenoxyennea(ethyleneoxy)ethanol,
2-(1,3,5-trimethylhexyl)-4-(1,3-dimethylbutyl)phenoxypenta(ethyleneoxy)ethanol,
4-(3,5,5-trimethylheptyl)phenoxyhexa(ethyleneoxy)ethanol,
3-(3,5,7,7-trimethyl-5-ethylnonyl)phenoxyhepta(ethyleneoxy)ethanol,
4-(1,1,3,3,5,5,7,7-decamethyldecyl)phenoxyennea(ethyleneoxy)ethanol,
4-n-pentacosylphenoxypenta(ethyleneoxy)ethanol,
3,5-di-n-decyl-4-n-pentylphenoxydeca(ethyleneoxy)ethanol,
beta-hydroxyethyleneoxytetraconta(propyleneoxy)octadeca(ethyleneoxy)ethanol,
beta-hydroxyethoxyoctadeca(ethyleneoxy)tetraconta(propyleneoxy)ethanol,
beta-hydroxyethoxyennea(ethyleneoxy)pentaconta(propyleneoxy)deca(ethyleneoxy)ethanol,
beta-hydroxyethoxynonadeca(ethyleneoxy)hexaconta(propyleneoxynonadeca(ethyleneoxy)ethanol,
beta-hydroxyethoxytetradeca(ethyleneoxy)pentatetraconta(propyleneoxy)tetradeca(ethyleneoxy)ethanol,
phenoxyethyleneoxypentapentaconta(propyleneoxy)octatriaconta(ethyleneoxy)ethanol,
4-methylphenoxyldeca(ethyleneoxy)nonatetraconta(propyleneoxy)eicosa(ethyleneoxy)ethanol,
4-(1,3,5-trimethylhexy)phenoxyhexa(ethyleneoxy)pentacontra(propyleneoxy)triconta(ethyleneoxy)ethanol,
4-n-pentacosylphenoxypentacosa(ethyleneoxy)pentaconta(propyleneoxy)deca(ethyleneoxy)ethanol,
2,4,5-trimethylphenoxydeca(ethyleneoxy)pentaconta(propyleneoxy)pentacosa(ethyleneoxy)ethanol,
2-(1,3,5-trimethylhexyl)-4-(1,1,3,3-tetramethylbutyl)phenoxyeicosa(ethyleneoxy)hexatetraconta(propyloxy)penta(ethyleneoxy)ethanol,
4-n-pentacosylphenoxyeicosa(ethyleneoxy)hexaconta(propyleneoxy)nonatriaconta(ethyleneoxy)ethanol,
and the like, and mixture thereof.

Many of the nonionic emulsifying agents coming within the scope of the general Formula 2 are commercially available. These commercially available emulsifying agents include: Triton X–114 which is a mixture of octylphenoxypoly(ethyleneoxy)ethanols with 7–8 ethyleneoxy groups in the poly(ethyleneoxy) chain; Neutronyx 600, 611 and 656, nonylphenoxypoly(ethyleneoxy)ethanols with 9–11 ethyleneoxy groups in the poly(ethyleneoxy) chain; Igepal CA–630, CO–610, and CO–710, nonylphenoxypoly(ethyleneoxy)ethanols with 9–11 ethyleneoxy groups in the poly(ethyleneoxy) chain; and Pluronic L–103, $HO(C_2H_4O)_a(C_3H_6O)_b(C_2H_4O)_cH$, where the sum of $a$ and $c$ is 30 and $b$ is about 56.

The relative amounts of the various components of the alkaline cationic asphalt emulsions of this invention can vary, but that given below will be found suitable:

|  | General, Weight Percent | Preferred, Weight Percent |
|---|---|---|
| Asphalt | 50–70 | 60–65 |
| Cationic emulsifier | 0.1–2 | 0.25–0.4 |
| Water | 50–25 | 32–39 |

Where medium- or slow-setting alkaline cationic asphalt emulsions are desired, 0.1 to 1.5 weight percent, preferably 0.8 to 1 weight percent, of the above-described select nonionic emulsion agents can be incorporated into the emulsions.

The asphalt emulsions of this invention can be prepared by preparing a soap solution comprising water (either soft or hard) and the cationic emulsifying agent, which soap solution is then mixed in a colloid mill or the like with the asphalt phase, the latter being preferably heated to reduce its viscosity. The nonionic emulsifying agents, where used in this invention, can be added to the soap solution and/or to the asphalt, or can be added after emulsification of the asphalt, particularly after cooling the emulsion, or can be added in part to the soap solution or asphalt and in part after emulsification. Usually, the emulsifiers and any modifiers or promoters are dispersed in the water to form the soap solution, which is then warmed to a temperature of 90–200° F., preferably 90–125° F. The asphalt can be heated to a temperature in the range of 150–350° F., preferably 250–300° F. The warm soap solution and hot asphalt are then proportioned to a colloid mill to emulsify the mixture, during which milling the temperature of the mixture can be in the range of 100–210° F., preferably 150–200° F. The completed emulsion can then be cooled to a temperature below 150° F. before being used or transferred to storage.

The alkaline cationic asphalt emulsions of this invention can be applied in paving, resurfacing, coating, etc., and will produce good uniform and smooth coatings. The emulsion can be mixed with siliceous aggregate, for example in the ratio of 0.5–5 parts emulsion to 4–10 parts siliceous aggregate, and the resulting slurry applied to the surface desired to be treated. After such application, the slurry sets in the usual manner to provide an adhering coating. The aggregate to be used preferably has a moisture content in the range of 5 to 20 percent, and dry aggregate can be prewet to provide this moisture content. In the "slurry seal" technique, the moist sand can be mixed with the asphalt emulsion to form a slurry of a consistency similar to that of a Portland cement mix. This slurry can be continuously dumped from a revolving drum mixer or other suitable mixing device onto a road surface, and as the paving vehicle proceeds along the road a rubber drag apron can be used to smooth the slurry to a uniform thickness. For this purpose, a graded sand aggregate containing more than 10 percent fines passing a 200 mesh sieve is preferred. For slow-setting emulsions, at least 1½ to 2 minutes will be usually required to mix the emulsion with the aggregate and spread the resulting slurry on the road surface before the emulsion breaks. In another application, the asphalt, emulsion, sand, and Portland cement or diatomaceous earth can be applied to surfaces as a mixture by the "gunmite" method, which is especially suited for coating canals, reservoirs, water ponds, dam facings, etc. Such application can be made with pneumatic-type spray equipment, such as a Refract-All Gun. Glass wool, rock wool, hemp, cotton, and other fibers can be added to the slurry or emulsion to provide coatings having higher tensile strength and which will not crack with shifting of the base or surface to which the coating is applied.

Further objects and advantages of this invention are illustrated in the following examples, but it should be understood that the various materials used and the amounts thereof, etc., recited in these examples are illustrative of preferred embodiments, and these examples should not be construed to unduly limit this invention.

In the examples which follow, the siliceous aggregate used in evaluation of various asphalt emulsions described therein was obtained from Baxter Springs, Kansas, and had the following characterization.

*Table I*

Sieve analysis (wt. percent):
  No. 10+ _____ 2.2
  No. 20+ _____ 17.3
  No. 40+ _____ 33.0
  No. 60+ _____ 18.8
  No. 100+ _____ 15.3
  No. 200+ _____ 6.1
  No. 200− _____ 7.3
Surface area, No. 100− fines, m.$^2$/gm. _____ 5
Composition (X-ray diffraction, 100− fines):
  α-Quartz, SiO$_2$ _____ +++
  Dolomite, CaMg(CO$_3$)$_2$ _____ +
  Calcite, CaCO$_3$ _____ +
  Calcium in total aggregate as percent
    CaCO$_3$ _____ 3.6

The mixing test used in the examples to evaluate the emulsions was that designed to simulate mixing in a slurry seal unit. The apparatus comprised a heavy 4-inch open container equipped with a 3-bladed paddle stirrer powered by a variable spede motor. The aggregate (100 grams) was placed in the assembled vessel and while stirring at low speed the aggregate was wet with about 20 ml. water, after which the speed of the stirrer was increased to about 100 r.p.m. About 20 grams of the emulsion was added rapidly to the wet aggregate. A timer was started at the instant the emulsion contacted the aggregate, and the mixing time was recorded as the time the mix could be stirred before the emulsion broke, as evidenced by solidification of the mix.

The soap solutions used in the examples contained the emulsifying agents and water, and were prepared by weighing the components directly. Stabilizers in some cases were added and the pH of the soap solution was adjusted to alkaline. The soap solution was charged to the feed tank of a colloid mill, and while circulating through the mill the asphalt was added slowly to the system. After asphalt addition was complete, milling continued for 1–5 min., depending on the viscosity and appearance of emulsion. The following conditions were maintained during milling:

Asphalt temp., ° F. _____ 220–280
Stator/rotor setting, in. _____ 0.003–0.005
Milling time, min. _____ 1–5
Milling temp., ° F. _____ 185–200

After milling, the emlsions were stored in capped containers at room temperature for a minimum of 24 hrs. prior to testing.

EXAMPLE I

A rapid-setting alkaline cationic asphalt emulsion of this invention was prepared using the recipe set forth in Table II.

*Table II*

| | Weight percent |
|---|---|
| Asphalt (150–200 pen.) | 61.9 |
| Cationic emulsifier [1] | 0.3 |
| Stabilizer [2] | 0.02 |
| Sodium hydroxide | 0.001 |
| Water | 37.8 |

[1] Hyamine 1622 (octylphenoxyethoxyethyldimethylbenzylammonium chloride).
[2] Natrosol 150–H (hydroxyethylcellulose).

The emulsion was prepared by blending all of the ingredients, except the asphalt and sodium hydroxide, together at room temperature, to produce a "soap solution" which was adjusted with sodium hydroxide to give a pH of 10.2. The asphalt was heated to 270° F. and then added simultaneously with the alkaline soap solution to a colloid mill, which was jacketed to maintain a temperature of 195° F. The milling was carried out for 3 to 5 min. The emulsion was stable in storage, not breaking to any detectable extent after 4 days of storage.

Said alkaline emulsion had a non-creamy appearance and did not contain sediment. Upon mixing it with the siliceous aggregate of Table I, according to the mixing test, it had a mixing time of 5.2 sec., and 80–90% of the aggregate was coated.

EXAMPLE II

Three quick-setting alkaline cationic asphalt emulsions A, B and C of this invention were prepared like that of Example I using the recipes of Table III. The properties of these emulsions were also determined and are set forth in Table III, together with the results of a modified miscibility test (ASTM D–2–60). The latter test indicates the ability of the emulsion to withstand dilution with water without breaking and gives a measure of the overall stability of the emulsion; a modified miscibility of less than 4½% indicates such stability.

*Table III*

|  | A | B | C |
|---|---|---|---|
| Recipe: | | | |
| Asphalt (120–150 pen.), wt. percent | 65.4 | 64.8 | 65.7 |
| Cationic emulsifier [1] | 0.3 | 0.3 | 0.3 |
| Sodium hydroxide | 0.001 | 0.001 | 0.001 |
| Water | 34.3 | 34.9 | 34.0 |
| Properties: | | | |
| pH | 10.0 | 10.0 | 10.0 |
| Mixing time, sec. | 3 | 2.5 | 2 |
| Modified miscibility test, percent | 0.1 | -------- | 0.7 |

[1] Emulsifiers used in Emulsions A, B and C were, respectively, Hyamine 1622 (octylphenoxyethoxyethyldimethylammonium chloride), Hyamine 2389 (methyldodecylbenzyltrimethylammonium chloride), and Hyamine 10–X (octylcresoxyethyldimethylbenzylammonium chloride).

EXAMPLE III

Five alkaline cationic asphalt emulsions of this invention were prepared like that of Example I. The resulting quick-setting emulsions were then converted to slow-setting emulsions by adding thereto certain nonionic emulsifiers. The recipes for these emulsions and the properties of the slow-setting emulsions are set forth in Table IV.

*Table IV*

|  | A | B | C | D | E |
|---|---|---|---|---|---|
| Recipe: | | | | | |
| Asphalt (120–150 pen.), wt. percent | 64.8 | 64.6 | 64.1 | 64.1 | 65.0 |
| Cationic emulsifier [1] | 0.3 | 0.3 | 0.3 | 0.3 | 0.3 |
| Nonionic emulsifier [2] | 1.0 | 1.0 | 1.0 | 1.0 | 1.0 |
| Sodium hydroxide | 0.001 | 0.001 | 0.001 | 0.001 | 0.001 |
| Water | 33.9 | 34.1 | 34.5 | 34.5 | 33.4 |
| Properties: | | | | | |
| pH | 10.0 | 10.0 | 10.0 | 10.0 | 10.0 |
| Mixing time, sec. | 180+ | 200+ | 180+ | 240+ | 180+ |
| Modified miscibility test, percent | 3.4 | 1.8 | 0.9 | 4.0 | 0.05 |

[1] Cationic emulsifier used in Emulsions A and B was Hyamine 1622, that used in Emulsions C and D was Hyamine 2389, and that used in Emulsion E was Hyamine 10–X.
[2] Nonionic emulsifier used in Emulsions A, C and E was Triton X–114, octylphenoxypoly(ethyleneoxy)ethanols, and that used in Emulsions B and D was Pluronic L–103, $HO(C_2H_4O)_a(C_3H_6O)_b(C_2H_4O)_cH$.

The slurries of each of the slow-setting emulsions with the siliceous aggregate of Table I all had excellent appearance, low foam and were smooth and workable. In each case 90 to 100% of the aggregate was coated with the emulsion. When the emulsions were evaluated by the cement mixing test (ASTM D–2–60), they all were found to have only a trace of a percent, thus indicating the emulsions are stable in the presence of Portland cement.

EXAMPLE IV

A number of quick-setting alkaline cationic asphalt were prepared using cationic emulsifiers outside the scope of this invention, i.e., outside the scope of general Formula 1. These other cationic emulsifiers were Triton X–400 (stearyldimethylbenzylammonium chloride), Hyamine 3500 (alkyldimethylbenzylammonium chloride in ethanol), Naliquat G–8–12 (1-(2-hydroxyethyl)-2-n-alkyl-1 (or 3)-benzyl-2-imidazolinium chloride in propanol) and Formonyte 7503 (dehydrogenated tallowdiethylammonium chloride in isopropanol). Each of these emulsions were unstable in storage, breaking in less than 4 days' storage, thus indicating that these particular emulsifying agents are not satisfactory for preparing alkaline cationic asphalt emulsions.

Various modifications and alterations of this invention will become apparent to those skilled in the art without departing from the scope and spirit of this invention, and it should be understood that this invention is not to be limited unduly to that set forth herein for illustrative purposes.

We claim:
1. An alkaline oil-in-water asphalt emulsion, said emulsion consisting essentially of an asphalt, water, a basic agent in an amount sufficient to maintain said emulsion alkaline and a cationic emulsifying agent characterized by the following formula:

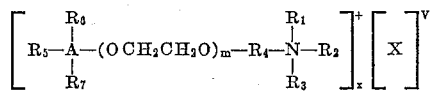

wherein $R_1$ and $R_2$ are hydrocarbon radicals having 1 to 3 carbon atoms; $R_3$ is selected from the group consisting of alkyl having 1 to 3 carbon atoms, arylalkaryl and aralkyl having 6 to 7 carbon atoms; $R_4$ is an alkylene having 1 to 2 carbon atoms; $R_5$ is an alkyl having 8 to 25 carbon atoms; $R_6$ and $R_7$ are selected from the group consisting of hydrogen and alkyl having 1 to 3 carbon atoms; A is a benzene nucleus; X is selected from the group consisting of a hydroxyl and a salt-forming anion; $m$ is an integer in the range of 0 to 1; $v$ is the valence of X, and $x$ is an integer equal to said valence, wherein said cationic emulsifying agent is present in said asphaltic emulsion in an amount sufficient to stabilize said alkaline emulsion.

2. The asphalt emulsion of claim 1, wherein the amount of said asphalt is 50 to 70 weight percent, the amount of said water is 25 to 50 weight percent, and the amount of said cationic emulsifying agent is 0.1 to 2 weight percent.

3. The asphalt emulsion of claim 1, further comprising a nonionic emulsifying agent of the general formula

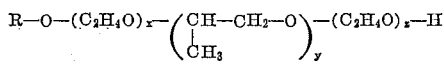

where:
R is selected from the group consisting of hydrogen, aryl, and alkylaryl radicals, and
$x$, $y$ and $z$ are integers, such that (1) when $x$ is zero, $y$ is also zero, $z$ is in the range of 6 to 11, inclusive, and said R is one of said alkyl and alkylaryl radicals, and (2) when $x$ and $y$ are each greater than zero, the sum of $x$ and $z$ is in the range of 20 to 40, inclusive, and $y$ is in the range of 40 to 60, inclusive.

4. The asphalt emulsion of claim 3, wherein the amount of said asphalt is 50 to 70 weight percent, the amount of said water is 25 to 50 weight percent, and the amount of said cationic emulsifying agent is 0.1 to 2 weight percent, and the amount of said nonionic emulsifying agent is 0.1 to 1.5 weight percent.

5. An alkaline oil-in-water asphalt emulsion, said emulsion consisting essentially of an asphalt, water, an amount of sodium hydroxide sufficient to maintain said emulsion alkaline and an amount of octylphenoxyethoxyethyldimethylbenzylammonium chloride sufficient to stabilize said alkaline emulsion.

6. An alkaline oil-in-water asphalt emulsion, said emulsion consisting essentially of an asphalt, water, an amount of sodium hydroxide sufficient to maintain said emulsion alkaline and an amount of methyldodecylbenzyltrimethylammonium chloride sufficient to stabilize said alkaline emulsion.

7. An alkaline oil-in-water asphalt emulsion, said emulsion consisting essentially of an asphalt, water, an amount of sodium hydroxide sufficient to maintain said emulsion alkaline, and an amount of octylcresoxyethoxyethyldimethylbenzylammonium chloride sufficient to stabilize said alkaline emulsion.

8. An alkaline oil-in-water asphalt emulsion, said emulsion consisting essentially of an asphalt, water and an amount of sodium hydroxide sufficient to maintain said emulsion alkaline, an amount of octylphenoxyethoxyethyldimethylbenzylammonium chloride sufficient to stabilize said alkaline emulsion and an amount of poly(ethyleneoxy)ethanol having 7 to 8 ethyleneoxy groups sufficient for reducing the setting rate of said alkaline emulsion.

9. An alkaline oil-in-water asphalt emulsion, said emulsion consisting essentially of asphalt, water, an amount of sodium hydroxide sufficient to maintain said emulsion alkaline, an amount of octylphenoxyethoxyethyldimethylbenzylammonium chloride sufficient to stabilize said alkaline emulsion and an amount of a compound of the formula:

$$HO(C_2H_4O)_a(C_3H_6O)_b(C_2H_4O)_cH$$

where the sum of $a$ and $c$ s about 30 and $b$ is about 56, sufficient for reducing the setting rate of said alkaline emulsion.

10. A composition consisting essentially of a slurry of electronegative aggregate and an oil-in-water alkaline cationic asphalt emulsion, said emulsion consisting essentially of asphalt, water, a basic agent in an amount sufficient to maintain said emulsion alkaline and a cationic emulsifying agent having the general formula:

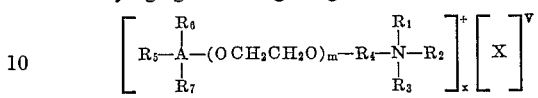

where $R_1$ and $R_2$ are hydrocarbon radicals having 1 to 3 carbon atoms; $R_3$ is selected from the group consisting of alkyl having 1 to 3 carbon atoms, aryl, alkaryl or aralkyl having 6 to 7 carbon atoms; $R_4$ is an alkylene having 1 to 2 carbon atoms; $R_5$ is an alkyl having 8 to 25 carbon atoms; $R_6$ and $R_7$ are selected from the group consisting of hydrogen and alkyl having 1 to 3 carbon atoms; A is a benzene nucleus; X is selected from the group consisting of a hydroxyl and a salt-forming anion; $m$ is an integer in the range of 0 to 1; $v$ is a valence of X; and $x$ is an integer equal to said valence, said cationic emulsifying agent being present in an amount sufficient to stabilize said alkaline emulsion.

References Cited by the Examiner

UNITED STATES PATENTS

| | | | |
|---|---|---|---|
| 2,706,688 | 4/1955 | Sommer et al. | 106—83 |
| 2,901,369 | 8/1959 | Pordes | 106—122 |
| 3,050,468 | 8/1962 | Wright | 252—311.5 |
| 3,126,350 | 3/1964 | Borgfeldt | 106—277 XR |

FOREIGN PATENTS

| | | |
|---|---|---|
| 645,098 | 7/1962 | Canada. |
| 819,371 | 9/1959 | Great Britain. |

ALEXANDER H. BRODMERKEL, *Primary Examiner.*

MORRIS LIEBMAN, *Examiner.*

J. B. EVANS, *Assistant Examiner.*